United States Patent
Kotecha (10) Patent No.: US 8,020,075 B2
(45) Date of Patent: Sep. 13, 2011

(54) CHANNEL QUALITY INDEX FEEDBACK REDUCTION FOR BROADBAND SYSTEMS

(75) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 956 days.

(21) Appl. No.: 11/687,376

(22) Filed: Mar. 16, 2007

(65) Prior Publication Data

US 2008/0229177 A1    Sep. 18, 2008

(51) Int. Cl.
H03M 13/00    (2006.01)

(52) U.S. Cl. ......................... 714/776; 370/332

(58) Field of Classification Search .......... 714/776; 370/332
See application file for complete search history.

(56) References Cited

U.S. PATENT DOCUMENTS

| | | |
|---|---|---|
| 5,909,649 A | 6/1999 | Saunders |
| 6,473,467 B1 | 10/2002 | Wallace et al. |
| 6,968,092 B1 | 11/2005 | Winger |
| 7,110,463 B2 | 9/2006 | Wallace et al. |
| 7,139,328 B2 | 11/2006 | Thomas et al. |
| 7,151,809 B2 | 12/2006 | Ketchum et al. |
| 7,164,649 B2 | 1/2007 | Walton et al. |
| 7,809,074 B2 | 9/2008 | Kotecha et al. |
| 7,505,527 B2 | 3/2009 | Hwang et al. |
| 7,602,837 B2 | 10/2009 | Kotecha et al. |
| 7,607,832 B2 | 10/2009 | Kotecha et al. |
| 7,751,368 B2 * | 7/2010 | Li et al. ............. 370/332 |
| 2004/0066761 A1 | 4/2004 | Giannakis |
| 2004/0076224 A1 | 4/2004 | Onggosanusi et al. |
| 2004/0108944 A1 | 6/2004 | Lee et al. |
| 2004/0228423 A1 | 11/2004 | Gueguen |
| 2005/0009476 A1 | 1/2005 | Wu et al. |
| 2005/0043031 A1 | 2/2005 | Cho et al. |
| 2005/0101259 A1 | 5/2005 | Tong |
| 2005/0117660 A1 | 6/2005 | Vialle |
| 2005/0129137 A1 | 6/2005 | Yamada et al. |
| 2005/0201296 A1 | 9/2005 | Vannithamby et al. |

(Continued)

FOREIGN PATENT DOCUMENTS

EP    1453262 A1    1/2004

OTHER PUBLICATIONS

Analysis on DCT based CQI Reporting Scheme, 3GPP TSG RAN WG1 #46-bis, R1-062954, Seoul, Republic of Korea, Oct. 9-13, 2006.

(Continued)

*Primary Examiner* — Sam Rizk
(74) *Attorney, Agent, or Firm* — Gazdzinski & Associates, PC (57) ABSTRACT

A system and methodology are disclosed for exploiting channel correlation in time and/or frequency to reduce CQI feedback in wireless communications systems. By compressing CQI feedback at the receiver to reduce redundancy in CQI feedback information that results from the channel correlation, the average feedback rate is reduced. In various embodiments, redundancy in time may be removed from the CQI feedback by monitoring variations of the CQI information in time at the receiver so that CQI information for a given CQI reporting instance is communicated to the transmitter only if it differs from the CQI information for the previous CQI reporting instance. Otherwise, no feedback is performed. In other embodiments, CQI feedback is compressed by performing a discrete cosine transform (DCT) on the CQI data. The compressed CQI feedback information is then communicated to the transmitter through the feedback control channel where it is decoded into the original CQI information and used to generate signal processing information for various sub-carriers.

22 Claims, 7 Drawing Sheets

U.S. PATENT DOCUMENTS

| | | |
|---|---|---|
| 2005/0276317 A1 | 12/2005 | Jeong et al. |
| 2006/0072677 A1 | 4/2006 | Kwak et al. |
| 2006/0092054 A1 | 5/2006 | Li et al. |
| 2006/0093065 A1 | 5/2006 | Thomas et al. |
| 2006/0098760 A1 | 5/2006 | Shen et al. |
| 2006/0111100 A1 | 5/2006 | Murata et al. |
| 2006/0120478 A1 | 6/2006 | Kim et al. |
| 2006/0121946 A1 | 6/2006 | Walton et al. |
| 2006/0155534 A1 | 7/2006 | Lin et al. |
| 2006/0155798 A1 | 7/2006 | Ketchum et al. |
| 2006/0209980 A1 | 9/2006 | Kim et al. |
| 2006/0279460 A1 | 12/2006 | Yun et al. |
| 2007/0026808 A1 | 2/2007 | Love et al. |
| 2007/0066571 A1 | 3/2007 | Stockel et al. |
| 2007/0070967 A1 | 3/2007 | Yang et al. |
| 2007/0071147 A1 | 3/2007 | Sampath et al. |
| 2007/0086540 A1 | 4/2007 | Chae et al. |
| 2007/0098106 A1 | 5/2007 | Khojastepour et al. |
| 2007/0099571 A1 | 5/2007 | Withers, Jr. et al. |
| 2007/0127608 A1 | 6/2007 | Scheim et al. |
| 2007/0147535 A1 | 6/2007 | Niu |
| 2007/0191066 A1 | 8/2007 | Khojastepour |
| 2007/0195974 A1 | 8/2007 | Li et al. |
| 2007/0211813 A1 | 9/2007 | Talwar et al. |
| 2007/0223619 A1 | 9/2007 | Lee et al. |
| 2007/0249296 A1 | 10/2007 | Howard et al. |
| 2007/0286304 A1 | 12/2007 | Kim et al. |
| 2007/0297528 A1 | 12/2007 | Feder et al. |
| 2008/0013610 A1 | 1/2008 | Varadarajan et al. |
| 2008/0056414 A1 | 3/2008 | Kim et al. |
| 2008/0075058 A1 | 3/2008 | Mundarath et al. |
| 2008/0076370 A1 | 3/2008 | Kotecha et al. |
| 2008/0080448 A1 | 4/2008 | Huang et al. |
| 2008/0080449 A1 | 4/2008 | Huang et al. |
| 2008/0080459 A1 | 4/2008 | Kotecha |
| 2008/0102846 A1* | 5/2008 | Kim et al. ............... 455/450 |
| 2008/0118008 A1 | 5/2008 | Kotecha |
| 2008/0159425 A1 | 7/2008 | Khojastepour et al. |
| 2008/0165875 A1 | 7/2008 | Mundarath et al. |
| 2008/0187062 A1 | 8/2008 | Pan et al. |
| 2008/0212701 A1 | 9/2008 | Pan et al. |
| 2008/0212702 A1 | 9/2008 | Pan |
| 2008/0227495 A1 | 9/2008 | Kotecha et al. |
| 2009/0190688 A1 | 7/2009 | Kotecha et al. |
| 2010/0202553 A1 | 8/2010 | Kotecha et al. |

OTHER PUBLICATIONS

International Search Report and Written Opinion for correlating PCT Patent Application No. PCT/US2008/056579 dated Jul. 31, 2008.
Soo-Yong Jeon et al.; 'Channel Adaptive CQI Reporting Schemes for HSDPA Systems';Communications Letter, IEEE; vol. 10; Issue 6; Jun. 2006; pp. 459-461.
B. Clerckx, "Space-Time Signaling for Real-World MIMO Channels," Sep. 2005.
R. F.H. Fischer et al., "A New Loading Algorithm for Discrete Multitone Transmission," IEEE 1996.
A. Goldsmith et al., "Variable-Rate Variable-Power Mqam for Fading Channels," IEEE Transactions on Communications, vol. 45, No. 10, Oct. 1997.
A. Goldsmith et al., "Adaptive Coded Modulation for Fading Channels," IEEE Transactions on Communications, vol. 46, No. 5, May 1998.
Z. Hong et al., "Spatial Multiplexing in Correlated Fading via the Virtual Channel Representation," IEEE Journal on Selected Areas in Communications, Jun. 2003.
N. Khajehnouri et al., "A Minimum Co-User Interference Approach for Multi-User Mimo Downlink Precoding," ICASSP 2006.
M. Vu et al., "MIMO Wireless Precoding," www.stanford.edu/~mhv/SPM_MIMO_Wireless_Precoding.pdf.
Kim et al., U.S. Appl. No. 60/841,246, filed Aug. 31, 2006.
U.S. Appl. No. 11/537,902, filed Oct. 2, 2006, Office action mailed Jul. 14, 2009.
U.S. Appl. No. 11/537,902, filed Oct. 2, 2006, Response filed Oct. 14, 2009.
U.S. Appl. No. 11/537,902, filed Oct. 2, 2006, Notice of Allowance mailed Dec. 2, 2009.
U.S. Appl. No. 12/762,013, filed Apr. 16, 2010, Preliminary Amendment filed Apr. 16, 2010.
Yi, "Beamforming for MIMO systems with limited feedback," 2006 IET International Conference on Wireless, Mobile and Multimedia Networks, Nov. 6-9, 2006 pp. 1-3.
PCT International Search Report and Written Opinion related to PCT/US2008/054355 dated Jun. 27, 2008.
Mondal, "Frame theoretic quantization for limited feedback Mimo beamforming systems" 2005 International Conference on Wireless Networks, Communications and Mobile Computing, vol. 2, Jun. 13-16, 2005 pp. 1065-1070 vol. 2.
Freescale, "Overview and Way forward on MIMO Precoding in DL EUTRA," R1-070220 Jan. 2006 3GPP TGS RAN WG1 Meeting #47bis, Sorrento, Italy.
Philips, "Comparison between MU-MIMO codebook-based channel reporting techniques for LTE downlink," R1-062483, Oct. 2006. 3GPP TGS RAN WG1 Meeting #46bis, Seoul.
Philips, "System-level simulation results for channel vector quantisation feedback for MU-MIMO," R1-063028, Nov. 2006. 3GPP, TGS RAN WGI Meeting #47, Riga.
Philips, "Comparison of MU-MIMO Feedback Schemes with Multiple UW Receive Antennas," 3GG TSG RAN WG1 Meeting #47bis, Sorrento, Italy, Jan. 15-19, 2007, Tdoc R1-070346.
Alcatel, "Link-level results for multiuser eigenmode transmission with limited feedback;" R1-070318 3GG TSG RAN WG1Meeting #47bis, Sorrento, Italy, Jan. 15-19, 2007, Tdoc R1-070318.
Alcatel-Lucent, Philips, "Dedicated Reference Signals for MU-MIMO Precoding in E-UTRA Downlink," TSG-RAN WG1 #48, St. Louis, Missouri, Feb. 12-16, 2007, R1-071069.
Freescale, "Scheme for MU-MIMO in DL EUTRA," R1-070608 (this is an update of R1-070223 and in the document the number was R1-070223. The Examiner changed to 608), Jan. 2007, 3GPP TGS RAN WG1 Meeting #47bis, Sorrento, Italy.
Freescale, Efficient method for feedback reduction and feedback mechanism for precoded MIMO in EUTRA R1-070221 Jan. 2006 3GPP TGS RAN WG1 Meeting #47bis, Sorrento, Italy.
Freescale, "Aspects of SU/MU Switching and MU-MIMO in DL EUTRA," R1-070222 Jan. 2006 3GPP TGS RAN WG1 Meeting #47bis, Sorrento, Italy.
Freescale, "Scheme for MU-MIMO in DL Eutra," R1-070223 Jan. 2006 3GPP TGS RAN WG1 Meeting #47bis, Sorrento, Italy.
U.S. Appl. No. 11/687,508, filed Mar. 16, 2007, Office Action dated Feb. 1, 2010.
U.S. Appl. No. 11/687,508, filed Mar. 16, 2007, Response filed May 3, 2010.
U.S. Appl. No. 11/687,508, filed Mar. 16, 2007, Supplemental Response filed May 17, 2010.
U.S. Appl. No. 11/687,508, filed Mar. 16, 2007, Notice of Allowance mailed May 28, 2010.
A. Bourdoux et al, "Joint TX-RX Optimisation for MIMO-SDMA Based on a Null-space Constraint," IEEE Vehicular Technology Conference, vol. 1, 2002.
K. Wong et al, "Performance Enhancement of Multiuser MIMO Wireless Communication Systems," IEEE Transactions on Communications, vol. 50, No. 12, Dec. 2002.
Wei et al., Tackling MIMO-OFDMA Feedback Load Through Feedback Encoding, IEEE Wireless Communication Systems, pp. 363-367 (Sep. 6-8, 2009).
U.S. Appl. No. 11/535,679, filed Sep. 27, 2006, Office Action mailed Oct. 27, 2009.
U.S. Appl. No. 11/535,679, filed Sep. 27, 2006, Response filed Jan. 27, 2010.
U.S. Appl. No. 11/535,679, filed Sep. 27, 2006, Office Action mailed Apr. 30, 2010.
U.S. Appl. No. 11/535,679, filed Sep. 27, 2006, Response filed Jul. 30, 2010.
U.S. Appl. No. 11/535,679, filed Sep. 27, 2006, Examiner Interview Summary mailed Oct. 22, 2010.
U.S. Appl. No. 11/535,679, filed Sep. 27, 2006, Supplemental Response filed Oct. 22, 2010.

U.S. Appl. No. 11/535,679, filed Sep. 27, 2006, Office Action mailed Jan. 21, 2011.
B. Banister et al., "A Simple Gradient Sign Algorithm for Transmit Antenna Weight Adaptation with Feedback," IEEE Transactions on Signal Processing, vol. 51, No. 5, May 2003.
K. Huang et al., "Effect of Feedback Delay on Limited Feedback for Temporally Correlated Channels," Jul. 2006.
K. Huang et al., "Joint Beamforming and Scheduling for SDMA Systems with Limited Feedback," Jun. 2006.
K. Huang et al., "Limited Feedback for Temporally-Correlated Channels_ Feedback Rate and Delay," Mar. or Jun. 2006.
K. Huang et al., "Markov models for multi-antenna limited feedback systems," ICASSP, Jun. 2006.
K. Huang et al., "Multi-Antenna Limited Feedback for Temporally-Correlated Channels Feedback Compression," Jul. 2006.
K. Huang et al., "Orthogonal Beamforming in SDMA Downlink with Limited Feedback," Jul. 2006.
J.C. Roh et al., "An Efficient Feedback Method for MIMO Systems with Slowly Time-Varying Channels," IEEE Communications Society, WCNC 2004.
N. Wei et al., Tackling MIMO-OFDMA Feedback Load Through Feedback Encoding, Sep. 6-8, 2009, IEEE Explore, pp. 363-367.
U.S. Appl. No. 11/537,948, filed Oct. 2, 2006, Preliminary Amendment dated Nov. 27, 2006.
U.S. Appl. No. 11/537,948, filed Oct. 2, 2006, Office Action mailed Mar. 18, 2009.
U.S. Appl. No. 11/537,948, filed Oct. 2, 2006, Response to Office Action filed Jun. 18, 2009.
U.S. Appl. No. 11/537,948, filed Oct. 2, 2006, Office Action mailed Sep. 30, 2009.
U.S. Appl. No. 11/537,948, filed Oct. 2, 2006, Response to Office Action filed Dec. 29, 2009.
U.S. Appl. No. 11/537,948, filed Oct. 2, 2006, Office Action mailed Apr. 15, 2010.
U.S. Appl. No. 11/537,948, filed Oct. 2, 2006, Response to Office Action mailed Jul. 15, 2010.
U.S. Appl. No. 11/537,948, filed Oct. 2, 2006, Office Action mailed Aug. 31, 2010.
U.S. Appl. No. 11/537,948, filed Oct. 2, 2006, Response to Office Action mailed Nov. 30, 2010.
N. Jindal,"Finite Rate Feedback MIMO Broadcast Channels," Feb. 2006 ita.ucsd.edu/workshop/06/talks/papers/79.pdf.
U.S. Appl. No. 11/620,203, filed Jan. 5, 2007, Office Action mailed Feb. 28, 2010.
U.S. Appl. No. 11/620,203, filed Jan. 5, 2007, Response filed Apr. 14, 2010.
U.S. Appl. No. 11/620,203, filed Jan. 5, 2007, Office Action mailed Sep. 30, 2010.
B. Hassibi, "An Efficient Square-Root Algorithm for Blast," Proceedings of the 2000 IEEE International Conference on Acoustics, Speech and Signal Processing, Jan. 27, 2000.
U.S. Appl. No. 11/562,557, filed Nov. 22, 2006, Office Action mailed Oct. 15, 2009.
U.S. Appl. No. 11/562,557, filed Nov. 22, 2006, Response to Office Action mailed Mar. 15, 2010.
U.S. Appl. No. 11/562,557, filed Nov. 22, 2006, Notice of Allowance mailed Jun. 4, 2010.
A. Goldmsmith et al, "Variable-Rate Variable-Power MQAM for Fading Channels," IEEE Transactions on Communications, vol. 45, No. 10, Oct. 1997.
D. Love, "Limited Feedback Unitary Precoding for Spatial Multiplexing Systems," IEEE Transactions on Information Theory, vol. 51, No. 8, Aug. 2005.
A. Goldsmith, "The Capacity of Downlink Fading Channels with Variable Rate and Power," IEEE Transactions on Vehicular Technology, vol. 46, No. 3, Aug. 1997.
K. Huang et al., "Effect of Feedback Delay on Limited Feedback for Temporally Correlated Channels," Jul. 2006.
K. Huang et al., "Joint Beamforming and Scheduling for SDMA Systems with Limited Feedback," Jun. 2006.
K. Huang et al., "Limited Feedback for Temporally-Correlated Channels—Feedback Rate and Delay," Mar. or Jun. 2006.
K. Huang et al., "Markov models for multi-antenna limited feedback systems," Jun. 2006.
K. Huang et al., "Multi-Antenna Limited Feedback for Temporally-Correlated Channels Feedback Compression," Jul. 2006.
K. Huang et al., "Orthogonal Beamforming in SDMA Downlink with Limited Feedback," Jul. 2006.
D. Love et al., "Feedback Methods for Multiple-Input Multiple-Output Wireless Systems," 2004.
P. Chow, "A Practical Discrete Multitone Transceiver Loading Algorithm for Data Transmission over Spectrally Shaped Channels," IEEE Transactions on Communications, vol. 43, No. 2/3/4, Feb./Mar./Apr. 1995.
R. Fischer et al., "A New Loading Algorithm for Discrete Multitone Transmission," Global Telecommunications Conference, GLOBECOM, 1996.
P. Xia et al., "Multiantenna Adaptive Modulation with Beamforming Based on Bandwidth-Constrained Feedback," IEEE Transactions on Communications, vol. 53, No. 3, Mar. 2005.
U.S. Appl. No. 11/536,280, filed Sep. 28, 2006, Office Action mailed Apr. 30, 2009.
U.S. Appl. No. 11/536,280, filed Sep. 28, 2006, Response filed Jul. 30, 2009.
U.S. Appl. No. 11/536,280, filed Sep. 28, 2006, Office Action mailed Nov. 5, 2009.
U.S. Appl. No. 11/536,280, filed Sep. 28, 2006, Response filed Feb. 5, 2010.
U.S. Appl. No. 11/536,280, filed Sep. 28, 2006, Office Action mailed Apr. 27, 2010.
U.S. Appl. No. 11/536,280, filed Sep. 28, 2006, Pre-Appeal Brief filed Jul. 27, 2010.
U.S. Appl. No. 11/536,280, filed Sep. 28, 2006, Notice of Panel Decision mailed Aug. 19, 2010.
U.S. Appl. No. 11/536,280, filed Sep. 28, 2006, Notice of Allowance mailed Aug. 30, 2010.
U.S. Appl. No. 11/536,280, filed Sep. 28, 2006, Request for Continued Examination filed Nov. 30, 2010.
S.V. Bana et al., "Space Division Multiple Access (SDMA) for Robust Ad hoc Vehicle Communication Networks," The IEEE Fourth International Conference on Intelligent Transportation Systems, 2001 IEEE Intelligent Transportation Systems.
D.J. Love et al, "Grassmannian Beamforming on Correlated MIMO Channels," IEEE Global Telecommunications Conference, Nov. 3-Dec. 3, 2004.
A. Bourdoux et al., "Joint TX-RX Optimisation for MIMO-SDMA Based on a Null-space Constraint," 2002 IEEE 56th Vehicular Technology Conference.
D.J. Love et al., "Grassmannian Beamforming for Multiple-Input Multiple-Output Wireless Systems," IEEE, 2003.
A.F. Naguib et al, Performance of Wireless CDMA with M-ary Orthogonal Modulation and Cell Site Antenna Arrays, IEEE, Journal on Selected Areas in Communications, vol. 14, No. 9, Dec 1996.
L. Dong et al., "Opportunistic Transmission Scheduling for Multiuser MIMO Systems," IEEE, 2003.
H. Shin et al., "Closed-form Formulas for Ergodic Capacity of MIMO Rayleigh Fading Channels," IEEE, 2003.
M. Torlak et al., "Fast Estimation of Weight Vectors to Optimize Multi-Transmitter Broadcast Channel Capacity," IEEE Transactions on Signal Processing, vol. 46, No. 1, Jan. 1998.
V. Zaharov et al., "Smart Antenna Application for Satellite Communication Systems with Space Division Multiple Access," Journal of Radio Electronics, N. 2, Feb. 5, 2001, printed Oct. 18, 2005.
M. Cooper et al., "Intelligent Antennas: Spatial Division Multiple Access," 1996 Annual Review of Communications.
G.J. Foschini et al., On Limits of Wireless Communication in a Fading Environment when Using Multiple Antennas, Wireless Personal Communications, vol. 6, 1998, pp. 311-335, http://www1.bell-labs.com/project/blast/wpc-v6n3.pdf.
R. Monzingo et al, Introduction to Adaptive Arrays, Chapter 3, John Wiley & Sons, 1980, pp. 78-151.
U.S. Appl. No. 11/254,392, filed Oct. 20, 2005, Notice of Allowance mailed Sep. 18, 2008.
U.S. Appl. No. 11/254,392, filed Oct. 20, 2005, RCE IDS filed Dec. 16, 2008.

U.S. Appl. No. 11/254,392, filed Oct. 20, 2005, Notice of Allowance mailed Jan. 5, 2009.
U.S. Appl. No. 11/254,392, filed Oct. 20, 2005, RCE Amendment filed Apr. 6, 2009.
U.S. Appl. No. 11/254,392, filed Oct. 20, 2005, Notice of Allowance mailed Jun. 4, 2009.
U.S. Appl. No. 12/419,701, filed Apr. 7, 2009, Preliminary Amendment mailed Apr. 7, 2009.
Freescale, "Scheme for MU-MIMO in DL EUTRA" R1-070608 (this is an update of R1-070223 and in the document the number was R1-070223. The Examiner changed to 608), Jan. 2007, 3GPP TGS RAN WG1 Meeting #47bis, Sorrento, Italy.
Freescale, "Overview and Way forward on MIMO Preceding in DL EUTRA" R1-070220 Jan. 2006 3GPP TGS RAN WG1 Meeting #47bis, Sorrento, Italy.
Freescale, "Efficient method for feedback reduction and feedback mechanism for precoded MIMO in EUTRA" R1-070221 Jan. 2006 3GPP TGS RAN WGI Meeting #47bis, Sorrento, Italy.
Freescale, "Aspects of SU/MU Switching and MU-MIMO in DL EUTRA" R1-070222 Jan. 2006 3GPP TGS RAN WG1 Meeting #47bis, Sorrento, Italy.
Freescale, "Scheme for MU-MIMO in DL EUTRA" R1-070223 Jan. 2006 3GPP TGS RAN WG1 Meeting #47bis, Sorrento, Italy.
Philips, Comparison between MU-MIMO Codebook-based Channel Reporting Techniques for LTE Downlink, R1064283, Oct. 2006. 3GPP RAN WG1 Meeting #46bis, Seoul.
Philips, "System-level simulation results for channel vector quantisation feedback for MU-MIMO," R1-063028, Nov 2006. 3GPP, TGS RAN WGI Meeting #47, Riga.
Alcatel, "Link-level results for multiuser eigenmode transmission with limited feedback;" R1-070318 3GG TSG RAN WG1Meeting #47bis, Sorrento, Italy, Jan. 15-19, 2007, Tdoc R1-070318.
Love, "Limited Feedback Precoding for Spatial Multiplexing Systems," Global Telecommunications Conference, 2003, GLOBECOM '03, IEEE vol. 4, Publication year 2003, pp. 1857-1861.
Love, "Limited Feedback Precoding for Spatial Multiplexing Systems Using Linear Receivers," Military Communications Conference, 2003, MILCOM 2003, IEEE vol. 1, Publication Year 2003, pp. 627-632.
Love, "Limited Feedback Unitary Precoding for Orthogonal Space-Time Block Codes," IEEE Transactions on Signal Processing, Publication date Jan. 2005, vol. 53, Issue 1, pp. 64-73.
Castro et al., "Adaptive Vector Quantization for Precoding Using Blind Channel Prediction in Frequency Selective MIMO Mobile Channels,".
Mondal, "Frame theoretic quantization for limited feedback MIMO beamforming systems" 2005 International Conference on Wireless Networks, Communications and Mobile Computing, vol. 2, Jun. 13-16, 2005 pp. 1065-1070 vol. 2.
Alcatel-Lucent, Philips, "Dedicated Reference Signals for MU-MIMO Precoding in E-UTRA Downlink," TSG-RAN WG1 #48, St. Louis, Missouri, Feb. 12-16, 2007, R1-071069.
Huang, "Multi-antenna Limited Feedback for Temporally-Correlated Channels: Feedback compression," in PROC. IEEE Global Telecommunication Conference, Nov. 2006.
Philips, "Comparison of MU-MIMO Feedback Schemes with Multiple UW Receive Antennas," 3GG TSG RAN WG1 Meeting #47bis, Sorrento, Italy, Jan. 15-19, 2007, Tdoc R1-070346.
U.S. Appl. No. 11/687,441, filed Jan. 25, 2005, Office Action mailed Apr. 1, 2010.
U.S. Appl. No. 11/687,441, filed Jan. 25, 2005, Response filed Jun. 22, 2010.
U.S. Appl. No. 11/687,441, filed Jan. 25, 2005 Office Action mailed Jul. 6, 2010.
U.S. Appl. No. 11/687,441, filed Jan. 25, 2005, Response filed Oct. 6, 2010.
U.S. Appl. No. 11/687,441, filed Jan. 25, 2005, Notice of Allowance mailed Oct. 19, 2010.
A. Bourdoux et al., "Joint TX-RX Optimisation for MIMO-SDMA Based on a Null-space Constraint," IEEE Vehicular Technology Conference, vol. 1, 2002.
K. Wong et al, "Performance Enhancement of Multiuser MIMO Wireless Communication Systems," IEEE Transactions on Communications, vol. 50, No. 12, Dec. 2002.
U.S. Appl. No. 11/535,702, filed Sep. 27, 2006, Office Action mailed Oct. 28, 2009.
U.S. Appl. No. 11/535,702, filed Sep. 27, 2006, Response dated Jan. 28, 2010.
U.S. Appl. No. 11/535,702, filed Sep. 27, 2006, Office Action dated May 11, 2010.
U.S. Appl. No. 11/535,702, filed Sep. 27, 2006, Response mailed Aug. 11, 2010.
U.S. Appl. No. 11/535,702, filed Sep. 27, 2006, Final Office Action dated Oct. 27, 2010.

* cited by examiner

CHANNEL QUALITY INDEX FEEDBACK REDUCTION FOR BROADBAND SYSTEMS

BACKGROUND OF THE INVENTION

1. Field of the Invention

The present invention is directed in general to field of information processing. In one aspect, the present invention relates to a system and method for reducing channel quality indicator (CQI) feedback in communication systems.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed.

Figure 1:
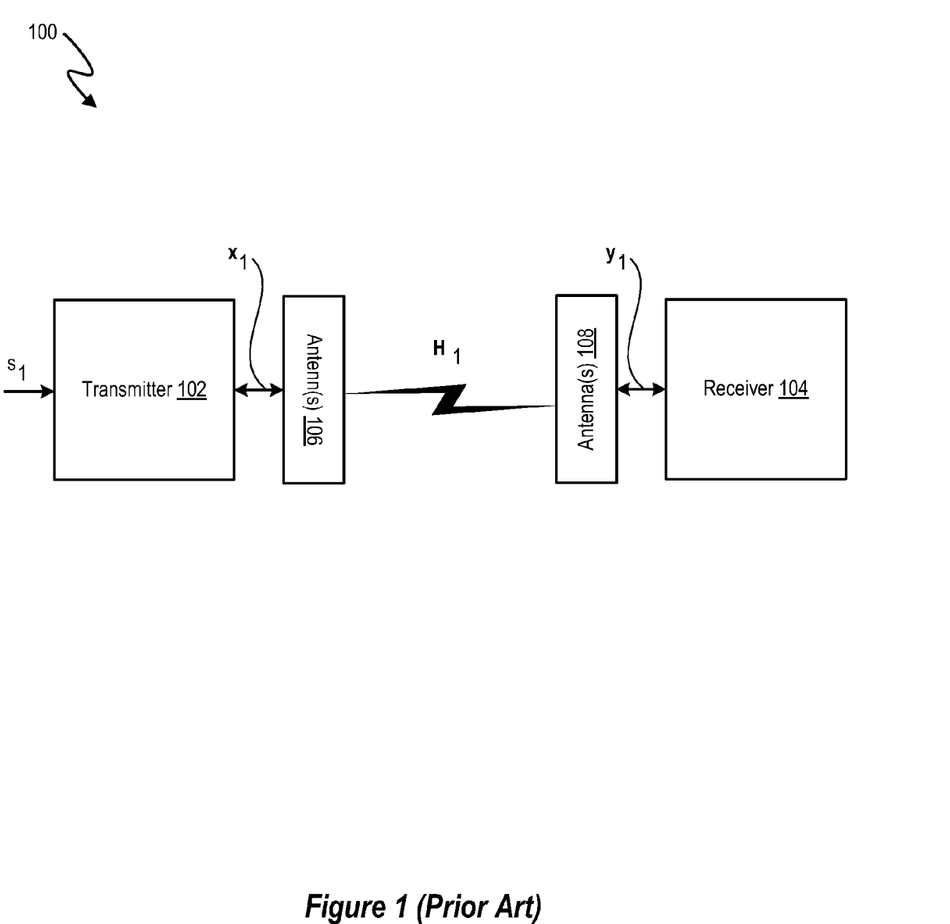
FIG. 1 (labeled prior art) depicts a wireless communication system.

FIG. 1 depicts a wireless communication system 100 in which a transmitter 102 having a single antenna or an array of antennas 106 communicates with receiver 104 having a single antenna or an array of antennas 108. The communication system 100 may be any type of wireless communication system, including but not limited to a MIMO system, SDMA system, CDMA system, OFDMA system, OFDM system, etc. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. Of course, the receiver/subscriber station 104 can also transmits signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal $s_1$) through one or more antennas 106 and over a channel $H_1$ to a receiver 104, which combines the received signal from one or more receive antennas 108 to reconstruct the transmitted data. To transmit the signal vector $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1 = H_1 x_1 + n_1$ (where n represents co-channel interference or noise). The channel matrix $H_1$ represents a channel gain between the transmitter antenna array 106 and the subscriber station antenna array 108. Thus, the channel matrix $H_1$ can be represented by an k×N matrix of complex coefficients, where N is the number of antennas in the transmitter/base station antenna array 106 and k is the number of antennas in the receiver/subscriber station antenna array 108. The value of k can be unique for each receiver/subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

In broadband communication systems which use multi-carrier modulation systems such as ODFM/OFDMA, channel quality indicators (CQI) such as "carrier to interference plus noise" ratio (CINR) are fed back from the receiver to the transmitter, in order to select the appropriate transmission profile. For instance, adapting the modulation and coding rates, and scheduling multiple users based on CQI improves data rates and link reliability. This technology has been, or will be, adopted in many current and future standards such as IEEE 802.16, 3 GPP LTE, etc.

Feeding back the CQI for multi-carrier systems such as OFDMA can potentially use up the usually small bandwidth allocated to the feedback control channel due to the multiplicity of the CQI coefficients. Accordingly, there is a need for a system and method for reducing the CQI feedback overhead is these systems. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A system and methodology are disclosed for exploiting channel correlation in time and/or frequency to reduce CQI feedback in wireless communication systems. The embodiments of the invention disclosed herein can be implemented in single antenna communication systems or in communication systems wherein the transmitter and/or the receiver comprise multiple antennas. By compressing CQI feedback at the receiver to reduce redundancy in CQI feedback information that results from channel correlation, the average feedback rate is reduced. In some embodiments, redundancy in time may be removed from the CQI feedback information by monitoring variations of the CQI information in time at the receiver so that CQI information for a given CQI reporting instance is communicated to the transmitter only if it differs from the CQI information for the previous CQI reporting instance. Otherwise, no feedback is performed. Compression of the CQI feedback information in time and frequency exploits the temporal correlation of the transmission channel wherein, statistically, the characteristics of the transmission channel change slowly over time in most cases of interest. This compression technique may also be applied to broadband communication systems by dividing a broadband channel into a plurality of clusters (where each cluster consists of one or more sub-carriers in a given frequency range) and then sending back CQI information only for those clusters where there is a change in CQI information, along with bit indices of the corresponding clusters to indicate cluster numbers. Additional compression may be obtained by limiting the number clusters for which temporally compressed CQI information is fed back, such as by ranking the candidate clusters according to a given predetermined or dynamic selection criterion and sending back the temporally compressed CQI information only for a predetermined number of the top-ranked clusters, where the predetermined number may be fixed or may be adjusted dynamically for different feedback intervals. In one embodiment, the given selection criterion for ranking the candidate cluster may be the absolute values such that the candidate clusters are ranked from highest CQI value to lowest CQI value, so that the top ranked candidate clusters correspond to the ones have highest CQI values. In another embodiment, the candidate clusters are ranked according to the changes in their CQI values from one reporting period to the next reporting period, so that the top ranked candidate clusters correspond to those clusters whose CQI values have changed the most. In some embodiments, CQI feedback is compressed by performing a multiple-input, multiple-output transform, such as the discrete cosine transform (DCT), on the CQI data, thereby generating a plurality of transform coefficients. In these embodiments, the transform coefficients are evaluated during a reporting instance, 'n', by comparing these coefficients to corresponding coefficients in a reporting instance, 'n−1'. In embodiments of the invention, the compressed feedback comprises all transform coefficients that have changed during a particular interval. In another embodiment, the feedback information comprises only the changed coefficients that meet a predetermined metric. This predetermined metric in one embodiment can be a threshold, where the threshold may be different for each DCT coefficient. In other embodiments, the candidate DCT coefficients can be selected in accordance with a dynamic metric which, in some embodiments, can be a dynamic threshold, In each of the embodiments described herein, the compressed CQI feedback information is communicated to the transmitter through the feedback control channel where it is processed to regenerate the original CQI state information and is used for scheduling and automatic modulation control (AMC). As used herein, CQI information is interpreted to include CQI state information comprising the actual CQI values, index information that can be used to represent CQI values, and/or CQI information obtained by performing a transform of CQI values, such as the multiple-input, multiple output transforms described hereinbelow.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 2A:
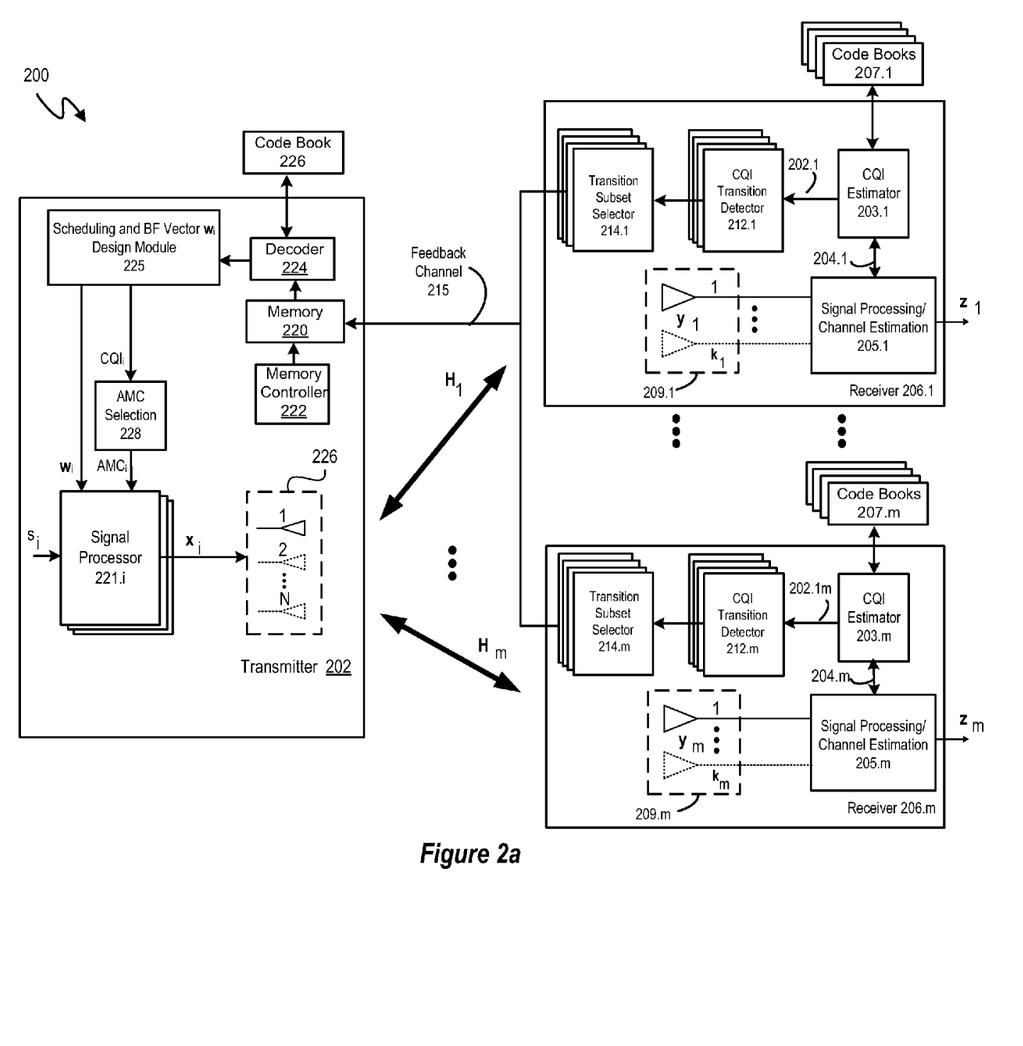
FIG. 2a depicts a wireless communication system in which CQI feedback is compressed in time and frequency at a receiver prior to feed back to a transmitter.

FIG. 2a depicts a wireless communication system 200 in which a transmitter 202 uses CQI feedback techniques to configure or adapt one or more input signals that are transmitted from a transmitter 202 (e.g., a base station) to one or more receivers 206.1-206.m (e.g., subscriber stations), where the CQI feedback values are compressed in time and/or frequency at a receiver 206.i prior to feed back to a transmitter 202. Those of skill in the art will understand that each receiver 206.i will provide a complete set of CQI information when it is initialized. Thereafter, the techniques described in connection with various embodiments of the invention can be used on reduce the amount of CQI information fed back to the transmitter 202.

The transmitter 202 includes a single antenna or an array or antennas 226 for communicating with the receivers 206.1-m. The receivers 206.1-m, may comprise a single antenna or an array of antennas 209.i for communicating with the transmitter 202. In operation, a data signal $s_i$ presented at the transmitter 202 for transmission to the receiver 206.i is transformed by the signal processor 221.i into a transmission signal represented by the vector $x_i$. The signals transmitted from the transmit antenna 226 propagate through a matrix channel $H_i$ and are received by the receive antennas 209.i where they are represented by the vector $y_i$. For a channel from the transmitter 202 to the $i^{th}$ receiver 206.i, the channel is denoted by $H_i$, $i \in \{1, 2, \ldots, m\}$. The channel matrix $H_i$ may be represented as an $k_i \times N$ matrix of complex entries representing the complex coefficients of the transmission channel between each transmit-receive antenna pair, where N represents the number of antennas of the transmitter 202 and $k_i$ represents the number of antennas of the $i^{th}$ receiver 206.i. At the receiver 206.i, the signal processing unit 205.i processes the $y_i$ signals received on the k antennas to obtain a data signal, $z_i$, which is an estimate of the transmitted data $s_i$. The processing of the received $y_i$ signals may include combining the $y_i$ signals with appropriate combining vector information retrieved from the codebook 207.i.

The channel matrix $H_i$—which specifies the transmission channel between a transmitter and an $i^{th}$ receiver—in the channel estimation signal processing unit 205.i. For example, in a MIMO implementation, each receiver 206.1-m determines its MIMO channel matrix $H_i$ by using pilot estimation or sounding techniques to determine or estimate the coefficients of the channel matrix $H_i$. Each receiver 206.$i$ uses the estimated MIMO channel matrix or other channel-related information (which can be channel coefficients or channel statistics or their functions, such as a precoder, a beamforming vector or a modulation order) to generate CQI information that is to be used to configure/adapt the signals transmitted by the transmitter.

Rather than feeding back the full CQI representation, the receiver 206.$i$ may use a codebook 207.$i$ to compress or quantize the transmission profile (e.g., CQI information) that is generated from the detected channel information and that can be used by the transmitter in controlling signal transmission to the receiver. The CQI estimator 203.$i$ generates a quantization/codebook index by accessing the receiver codebook 207.$i$ which stores an indexed set of possible transmission profiles and/or channel matrices $H_i$ along with associated CQI information so that the estimated channel matrix information 204.$i$ generated by the signal processing unit 205.$i$ can be used by the CQI estimator 203.$i$ to retrieve a codebook index from the codebook 207.$i$. The output of the CQI estimator 203.$i$ is provided to a CQI transition detector 212.$i$ that is operable to detect changes in the CQI information. If the CQI transition detector 212.$i$ detects a change in the CQI information of any cluster, the new CQI information is communicated to the transition subset selector 214.$i$ for transmission to the transmitter 202 via the feedback channel 215, in accordance with selection metrics described in greater detail below.

A selected subset of the CQI information, which may be in the form of indexed information, is transmitted via the feedback channel 215 and is stored in memory 220 of the transmitter 202. A memory controller 222 is operable to control the updating of the indexed CQI information in the memory 220 and to control the transfer of the indexed CQI information to the decoder 222. The decoder 222 is operable to process the indexed CQI information and to retrieve information from the codebook 226 to provide CQI information that can be used by scheduling module 225 and AMC selection module 228 to generate scheduling or AMC information, respectively, for a particular receiver 206.$i$.

The CQI information communicated to the transmitter 202 via the feedback channel 215 can be provided in a plurality of alternative formats. In one embodiment of the invention, the feedback subset comprises all CQIs that have changed during a particular CQI reporting instance. In this embodiment, the feedback subset may be limited to changed CQI information only, or it may include changed CQI information and a predetermined quantity of unchanged CQI information. In another embodiment, the feedback information transmitted to the transmitter 202 comprises a subset of only the changed CQIs that meet a predetermined selection criterion. In one embodiment, clusters corresponding to the changed CQI are ranked from highest CQI value to lowest CQI value, so that the top ranked 'F' candidate clusters (where 'F' is some integer number) corresponding to the ones have highest CQI values are chosen to be fed back. In another embodiment, the candidate clusters are ranked according to the changes in their CQI values from one reporting instance to the next reporting instance, so that the top ranked candidate clusters corresponding to those clusters whose CQI values have changed the most are fed back. In yet another embodiment, the candidate CQIs are selected in accordance with a dynamic selection criterion. In one embodiment, the dynamic selection criterion is such that the number 'F', of top ranked clusters whose CQI value are fed back, itself changes from one reporting instance to another.

Figure 2B:
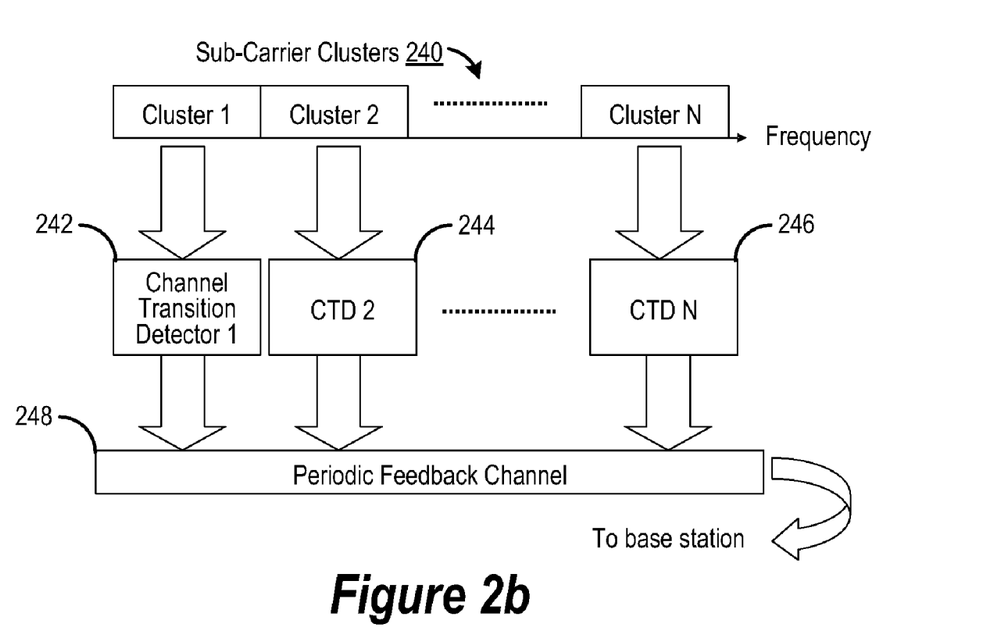
FIG. 2b depicts a generalized system flow for temporally compressing CQI feedback for broadband channels.

The CQI feedback compression techniques described above may be extended and applied to a variety of communication systems, including but not limited to TDD systems, FDD systems, OFDM systems and broadband systems. For example, FIG. 2$b$ depicts a generalized system flow for temporally compressing CQI feedback for a broadband channel. The channel may be divided into a plurality of clusters, where each cluster consists of one or more sub-carriers in a given frequency range. In FIG. 2$b$, the clusters are depicted as a sequence of contiguous and localized sub-carrier clusters 240 (Cluster 1, Cluster 1, . . . Cluster N), though there is no requirement that the clusters necessarily be either contiguous or localized. For example, a set of non-continuous sub-carriers can be mapped to each cluster. Likewise, though each cluster may contain a predetermined number of M sub-carriers, there is no requirement that each cluster have the same number of sub-carriers.

A single processor or controller could be used to detect channel transitions for all the clusters or for a subset of the clusters. Alternatively, and as illustrated in FIG. 2$b$, N separate channel transition detection circuits could be used, so that a first channel transition detector 242 is used to detect changes in the CQI feedback from a first cluster (or group of clusters), a second channel transition detector 244 is used to detect changes in the CQI feedback from a second cluster (or group of clusters), and so on. By sending CQI index information over the feedback channel 248 to the transmitter or base station only for those clusters whose CQI has changed in time, the amount of feedback may be significantly reduced, thereby providing efficient CQI feedback for the broadband channel.

Notwithstanding the efficiency benefits of using temporal feedback compression, a significant amount of feedback overhead may be consumed when feeding back CQI information for a broadband channel. Accordingly, a selected embodiment of the present invention further reduces the feedback overhead by sending temporally compressed feedback for only a subset of the clusters that have changed. In effect, an upper bound is placed on the number of clusters for which CQI feedback is allowed. For example, rather than sending feedback for all the clusters that have changed, feedback is sent only for a number F (where $1 \leq F \leq N$) of clusters from the clusters that have changed. Again, the feedback will consist of the changed CQI indices and log2(N) bits indicating which cluster has changed. To select which of the clusters having changed CQIs will provide feedback, the clusters can be ranked or sorted or otherwise chosen with any desired technique. For example, the candidate clusters may be ranked by their corresponding channel quality indicator, such as a CINR (Carrier-to-Interference plus Noise Ratio) or SINR (Signal-to-Interference plus Noise Ratio) value. Once the candidate clusters are ranked, F of the top-ranked candidate clusters are chosen for feedback. As will be appreciated, the fixed number F may be fixed across all feedback intervals, or may be variable for each feedback interval. When F is fixed, then the size of feedback is fixed, and when F is variable, the size of feedback is also variable. When F is fixed, and if less than F clusters, say C clusters, have changed CQI indices, then it is to be understood that zeros are sent in place of the F-C clusters or alternate information can sent in place of the F-C clusters.

Figure 3:
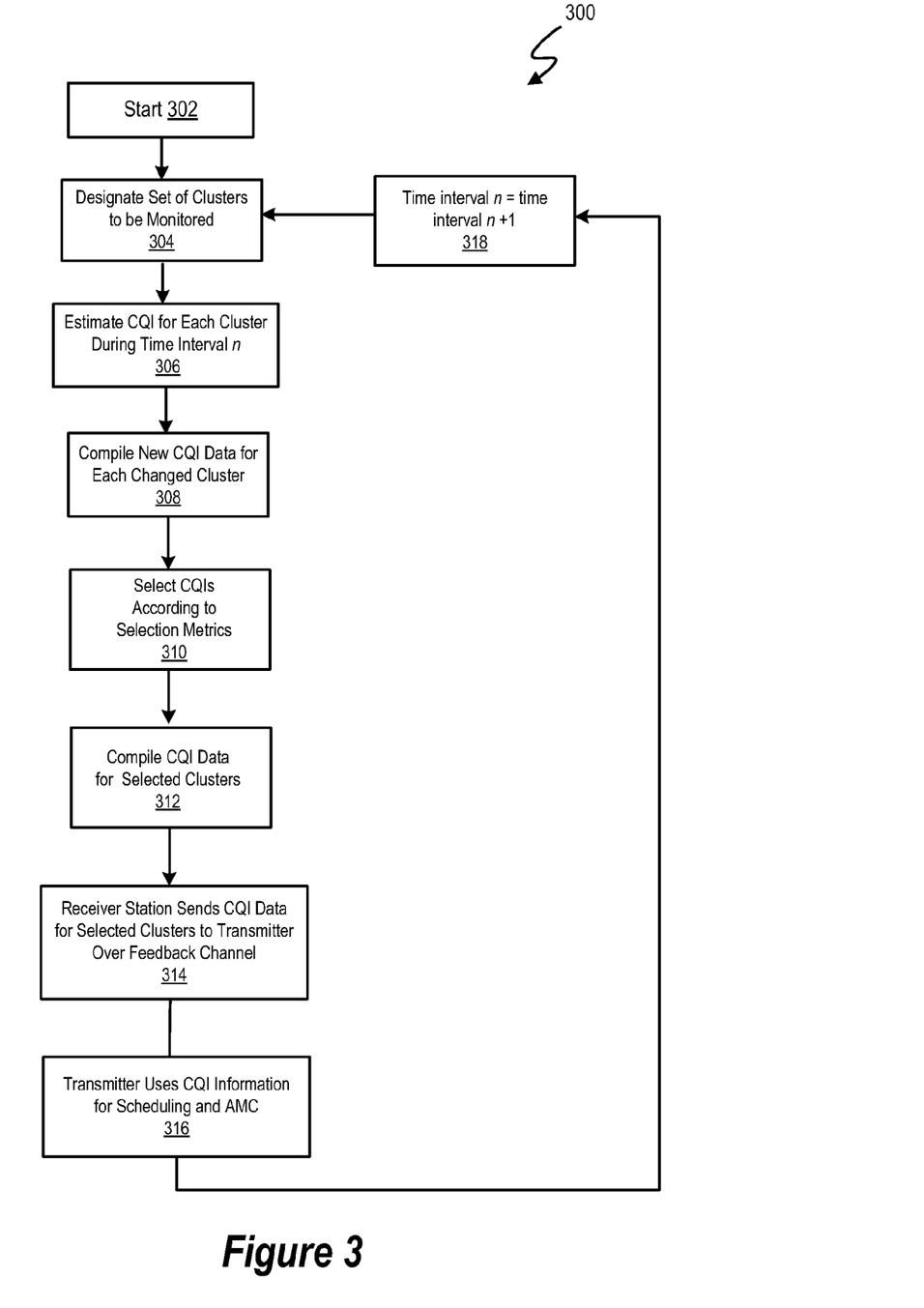
FIG. 3 depicts an example flow for a first methodology for using discrete cosine transform techniques to generate and feed back CQI data that is compressed in time and frequency.

FIG. 3 is a flowchart illustration of the processing flow for implementing the embodiments of the invention described above in connection with FIGS. 2$a$-$b$. In step 302, processing is initiated, followed by the designation, in step 304, of a set of clusters to be monitored for CQI changes. In step 306, the CQI is estimated for each of the designated clusters during a CQI reporting instance, 'n'. In step 308, CQI data for the changed clusters is compiled. In step, 310 a subset of the CQI data for the changed clusters is chosen in accordance with predetermined selection metrics. This data is then compiled in step 312 and transmitted from the receiver to the transmitter over a feedback channel in step 314. In step 316, the transmitter uses the CQI data for scheduling and AMC. Processing then proceeds to step 318 where the CQI reporting instance is incremented and the steps discussed above are repeated.

Figure 4A:
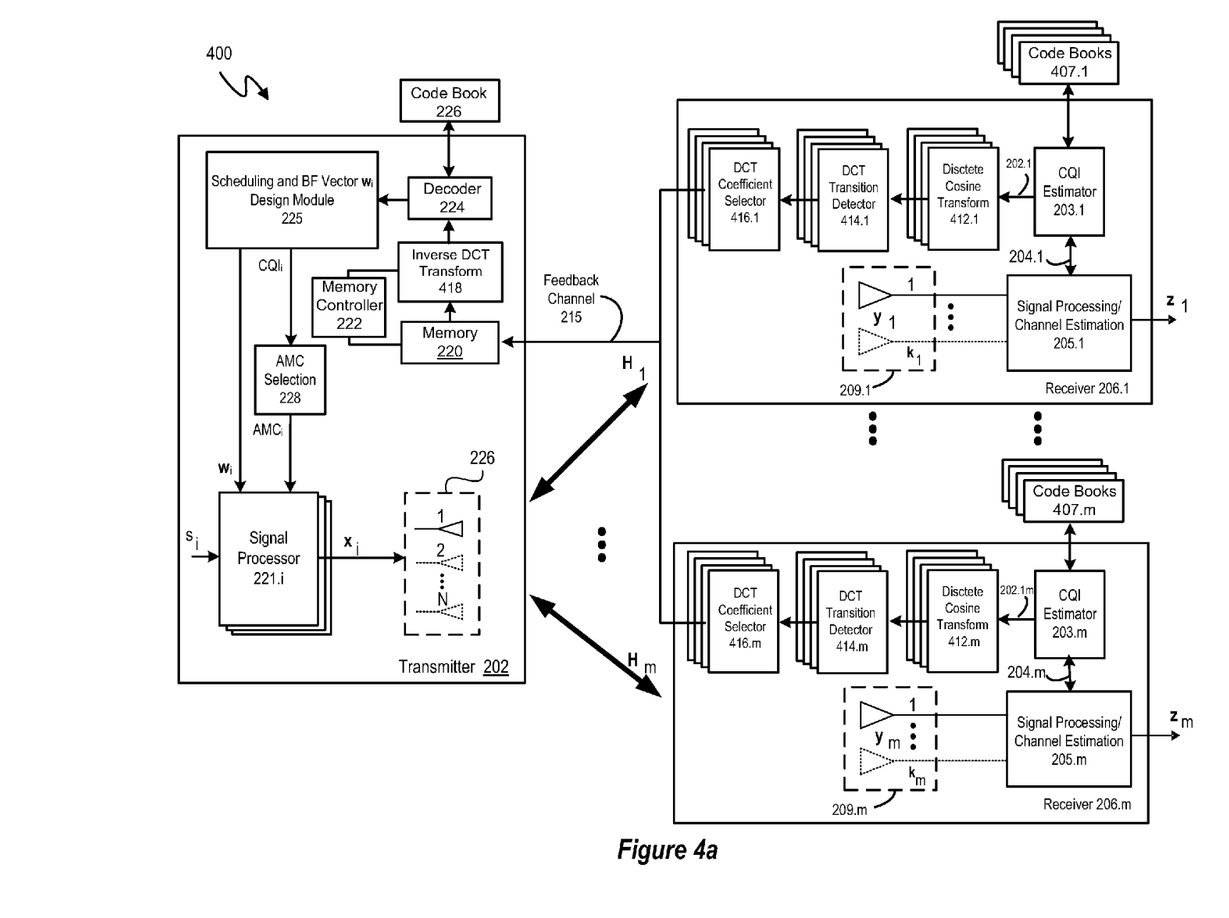
FIG. 4a depicts a wireless communication system in which CQI feedback is compressed in time and frequency by using discrete cosine transform techniques at a receiver prior to feed back to a transmitter.

FIG. 4a depicts a wireless communication system 400 wherein discrete cosine transformation techniques are used to compress CQI feedback values at a receiver 206.i prior to feed back to a transmitter 202. Many of the components of the transmitter 202 and the receiver 206i are substantially the same as discussed above in connection with FIG. 2a and, therefore, the discussion of these components will not be repeated. In the communication system shown in FIG. 4a, the CQI estimator 203.i generates a CQI value that is processed by a discrete cosine transform 412.i to generate a plurality of DCT coefficients. These DCT coefficients are provided to a DCT transition detector 414.i that is operable to detect a change in the coefficients that indicates a change in the DCT (and hence CQI) values. The output of the DCT transition detector 414.i is provided to a DCT coefficient selector 416.i that is operable to transmit DCT coefficient information to the transmitter 202, in accordance with predetermined selection metrics/criteria, for example a threshold-based criterion.

The DCT coefficient information, which may be in the form of indexed information, is transmitted via the feedback channel 215 and is received by the transmitter 202 and stored in memory 220. A memory controller 222 is operable to control the updating of the indexed DCT coefficients in the memory 220 and to control the transfer of the indexed DCT coefficients to the inverse DCT transform module 418. The inverse DCT module 418 then performs an inverse DCT transform on the updated DCT coefficients for each cluster to regenerate CQI index information for each cluster. The CQI index information is provided to a decoder 224 that is operable to retrieve information from the codebook 226 for CQI information for a particular receiver 206.i. The CQI information then used by the transmitter 202 for scheduling and AMC operations. The DCT coefficient information communicated to the transmitter 202 via the feedback channel 215 can be provided in a plurality of alternative formats. In one embodiment of the invention, the feedback comprises all DCT coefficients that have changed during a particular interval. In another embodiment, the feedback information transmitted to the transmitter 202 comprises only the changed DCT coefficients that meet a predetermined metric. This predetermined metric in one embodiment can be a threshold, i.e. a given DCT coefficient is chosen to be fed back if the change in its value from one reporting instance to another exceeds a certain predetermined threshold, where the threshold may be different for each DCT coefficient. In yet another embodiment, the candidate DCT coefficients are selected in accordance with a dynamic metric; this dynamic metric in one embodiment can be a dynamic threshold, i.e. a given DCT coefficient is chosen to be fed back if the change in its value from one reporting instance to another exceeds a certain threshold, where the threshold may be different for each DCT coefficient and may change from one reporting instance to another.

Figure 4B:
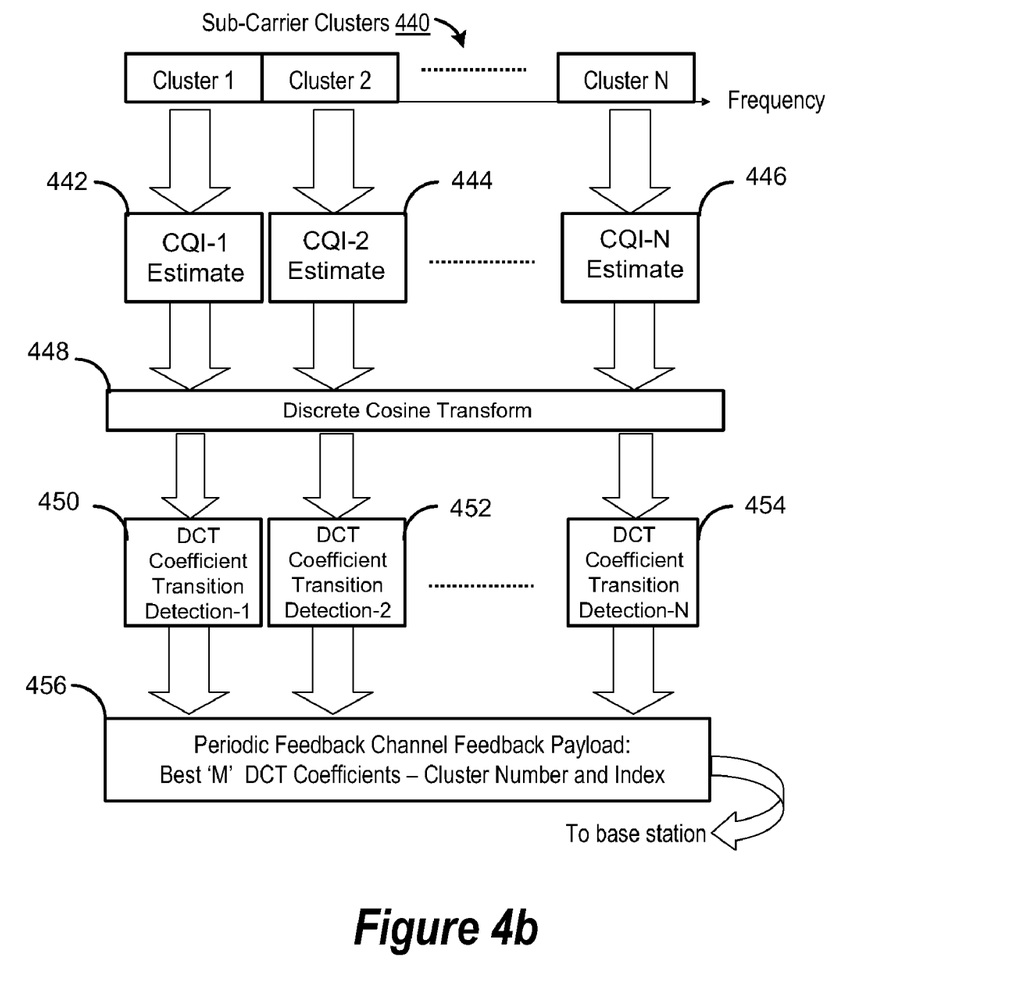
FIG. 4b depicts a generalized system flow for using discrete cosine transforms for temporally compressing CQI feedback for broadband channels.

FIG. 4b depicts a generalized system flow for temporally compressing CQI feedback for a broadband channel using DCT techniques. To implement DCT-based CQI compression for the broadband channel, the channel may be divided into a plurality of clusters, where each cluster consists of one or more sub-carriers in a given frequency range. In FIG. 4b, the clusters are depicted as a sequence of contiguous and localized sub-carrier clusters 440 (Cluster 1, Cluster 1, ... Cluster N), though there is no requirement that the clusters necessarily be either contiguous or localized. For example, a set of non-continuous sub-carriers can be mapped to each cluster. Likewise, though each cluster may contain a predetermined number of M sub-carriers, there is no requirement that each cluster have the same number of sub-carriers.

As will be understood by those of skill in the art, the discrete cosine transform is a multiple-input, multiple-output transform. The discrete cosine transform of CQI information for 'N' clusters will generate 'N' DCT coefficients. Furthermore, those of skill in the art will recognize that the embodiments of the invention described herein can be implemented using other multiple-input, multiple output transforms to process the CQI information for the plurality of clusters. For example, embodiments of the present invention can be implemented using a fast-Fourier transform.

As illustrated in FIG. 4b, N separate CQI estimator circuits can be used, so that a first CQI estimator 442 is used to detect changes in the CQI feedback from a first cluster (or group of clusters), a second CQI estimator 444 is used to detect changes in the CQI feedback from a second cluster (or group of clusters), and so forth. A discrete cosine transform 448 is performed across the 'N' cluster CQI outputs of the CQI estimators 442, 444, and 446 to generate DCT coefficients corresponding to the CQI changes in each of the clusters. The DCT coefficients are processed by DCT coefficient transition detectors 450, 452 and 454 to detect changes in the DCT coefficients. The DCT coefficient selector in the receiver then selects the best 'M' coefficients, in accordance with predetermined selection metrics, and transmits the corresponding cluster numbers and DCT indices to the transmitter via the feedback channel.

Figure 5:
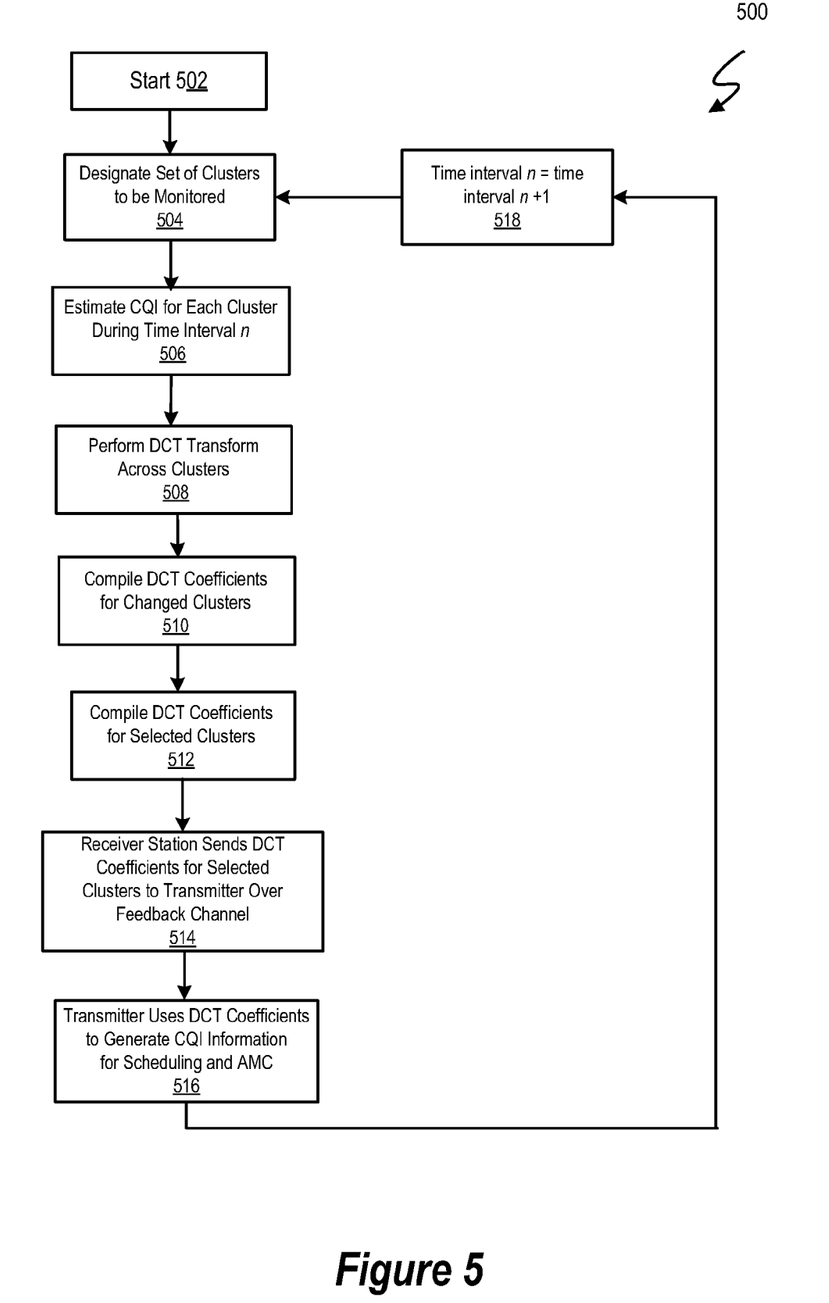
FIG. 5 depicts an example flow for a second methodology for generating and feeding back a CQI data that is compressed in time.

FIG. 5 is a flow chart illustration of the processing flow for implementing the embodiments of the invention described above in connection with FIGS. 4a-b. In step 502, processing is initiated, followed by the designation, in step 504, of a set of clusters to be monitored for CQI changes. In step 506, the CQI is estimated for each of the designated clusters during a CQI reporting instance, 'n'. In step 508, a DCT transform is performed across the 'N' clusters to obtain a plurality of DCT coefficients. In step 510, the DCT coefficients during reporting instance 'n' are compared with the DCT coefficients during reporting instance 'n−1' and for those DCT coefficients which have changed, the indices and DCT coefficients are complied. In step, 512 a subset of the changed DCT coefficients is chosen in accordance with predetermined selection metrics and this subset is transmitted from the receiver to the transmitter over a feedback channel in step 514. In step 516, the transmitter uses the DCT coefficients to regenerate CQI data for scheduling and AMC. Processing then proceeds to step 518 where the CQI reporting instance is incremented and the steps discussed above are repeated.

By now it should be appreciated that there has been provided a method and system for feeding back CQI by compressing the CQI feedback to reduce the average rate of CQI feedback. As described, the receiver estimates the channel state information for a transmission channel from a transmitting device by receiving one or more signals at the first receiving device. Using the channel state information, the receiver generates CQI information for the transmission channel by identifying a first CQI profile from a first codebook at the first receiving device that corresponds to the channel state information. For example, the CQI information may be a quantized CQI parameter, such as an index value from the first codebook that is associated with the first CQI profile that corresponds to the channel state information corresponding to the first CQI profile. In another example, a plurality of CQI profiles for a corresponding plurality of sub-carrier clusters (each having one or more sub-carriers) in a broadband channel may be identified and quantized into CQI indices. The CQI information is then compressed to remove redundancy from the CQI information, thereby generating compressed CQI information. A variety of compression techniques may be used. For example, the CQI information may be temporally compressed by sending CQI information for a predetermined CQI reporting instance over a feedback channel to the transmitting device only if a difference is detected between the CQI information for the predetermined CQI reporting instance and CQI information for a previous CQI reporting instance. Where there are a plurality of CQI profiles for a plurality of sub-carrier clusters, the plurality of CQI profiles may be compressed to remove temporal redundancy from the plurality of CQI profiles, thereby generating temporally compressed CQI information for each sub-carrier cluster. The temporally compressed CQI information may be sent over a feedback channel for only a first predetermined number F of the sub-carrier clusters whose CQI information has changed, where the predetermined number is either fixed or variable across a plurality of feedback interval. If the actual number C of sub-carrier clusters whose CQI information has changed is less than the first predetermined number F, then alternate information may be sent along with the temporally compressed CQI information, such that the alternate information is sent in place of the F-C sub-carrier clusters. However compressed, the compressed CQI information is fed back to the transmitting device where it is used to access a second codebook at the transmitting device to retrieve a second CQI profile that matches the first CQI profile and that is used to control transmission over the transmission channel from the transmitting device to the first receiving device.

The methods and systems for designing and using compressed CQI feedback in a limited feedback system as shown and described herein may be implemented in hardware or in software stored on a computer-readable medium and executed as a computer program on a general purpose or special purpose computer to perform certain tasks. For a hardware implementation, the elements used to perform various signal processing steps at the transmitter and/or at the receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various communications systems and methods for using same, the present invention is not necessarily limited to the example embodiments illustrate herein. For example, various embodiments of a communication system disclosed herein may be implemented in connection with various proprietary or wireless communication standards, such as IEEE 802.16e, 3GPP-LTE, DVB and other systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing signals in a communication system, comprising:
   using channel state information during a first CQI reporting instance to generate a first set of channel quality indicator (CQI) information for said transmission channel during a said first CQI reporting instance;
   using said channel state information during a second CQI reporting instance to generate a second set of CQI information for said transmission channel during a second CQI reporting instance;
   detecting changes in said second set of CQI information with respect to said first set of CQI information; and
   generating a compressed set of CQI information comprising a predetermined subset of CQI information in said second set of CQI information that is different from said first set of CQI information.

2. The method of claim 1, further comprising: using said compressed set of CQI information to generate signal processing information to transmit data from said transmitting device to said receiving device over said transmission channel.

3. The method of claim 1, where the compressed set of CQI information comprises only CQI information that meets predetermined selection metrics.

4. The method of claim 3, where the predetermined selection metrics are dynamically changed between said first CQI reporting instance and said second CQI reporting instance.

5. The method of claim 3, where selection metrics comprise:
   ranking CQI values for a plurality of 'N' candidate clusters having changed CQI information;
   selecting therefrom a subset of 'M' clusters having the highest CQI values; and
   using the CQI information of said 'M' clusters to generate said compressed set of CQI information.

6. The method of claim 3, where selection metrics comprise:
  ranking CQI values for a plurality of 'N' candidate clusters having changed CQI information;
  selecting therefrom a subset of 'M' clusters having the largest change in CQI magnitude; and
  using the CQI information of said 'M' clusters to generate said compressed set of CQI information.

7. The method of claim 1, where the changes in said second set of CQI information with respect to said first set of CQI information are detected using a CQI transition detector.

8. The method of claim 1, where the changes in said second set of CQI information with respect to said first set of CQI information are detected by:
  processing said first and second sets of CQI information using a multiple-input, multiple output transform, thereby generating first and second sets of transform coefficients; and
  detecting changes in said second set of transform coefficients with respect to said first set of transform coefficients.

9. The method of claim 8, where the said multiple-input, multiple-output transform comprises a discrete cosine transform.

10. The method of claim 1, wherein said wireless communication system comprises a plurality of transmission channels, with each channel having a plurality of CQI parameters.

11. A receiver for use in a wireless a communication system, comprising:
  channel quality indicator (CQI) logic operable use transmission channel state information to generate a first set of CQI information for a transmission channel during a first CQI reporting instance and a second set of CQI information for said transmission channel during a second CQI reporting instance;
  CQI transition detection logic operable to detect changes in said second set of CQI information with respect to said first set of CQI information;
  CQI selection logic operable to generate a compressed set of CQI information comprising only the CQI information in said second set of CQI information that is different from said first set of CQI information; and
  transmission logic operable to transmit said compressed set of CQI information to a transmitting device over a feedback channel.

12. The receiver of claim 11, where the compressed set of CQI information comprises only CQI information that meets predetermined selection metrics.

13. The receiver of claim 12, where the predetermined selection metrics are dynamically changed from one CQI reporting instance to another CQI reporting instance.

14. The receiver of claim 11, where the compressed set of CQI information is transmitted from said receiving device over a feedback channel.

15. The receiver of claim 11, where the changes in said second set of CQI information with respect to said first set of CQI information are detected by:
  processing said first and second sets of CQI information using a discrete cosine transform (DCT), thereby generating first and second sets of DCT coefficients; and
  detecting changes in said second set of DCT coefficients with respect to said first set of DCT coefficients.

16. The receiver of claim 11, wherein compressed set of CQI information comprises carrier to interference plus noise ratio (CINR) information.

17. A transmitter for use in a wireless communication system, comprising:
  signal processing logic operable to receive a compressed set of transmission channel CQI information from a receiver and to use said compressed set of CQI information to generate signal processing information to transmit data from said transmitter to a receiver over said transmission channel;
  wherein said compressed set of CQI information comprises a subset of changed CQI information detected by comparing a first set of CQI information for said transmission during a first CQI reporting instance with a second set of CQI information for said transmission channel during a second CQI reporting instance.

18. The transmitter of claim 17, where the compressed set of CQI information comprises only CQI information that meets predetermined selection metrics.

19. The transmitter of claim 18, where the predetermined selection metrics are dynamically changed from one CQI reporting instance to another CQI reporting instance.

20. The transmitter of claim 17, where said subset of changed CQI information is detected by:
  processing said first and second sets of CQI information using a multiple-input, multiple output transform-, thereby generating first and second sets of transform coefficients; and
  detecting changes in said second set of transform coefficients with respect to said first set of transform coefficients.

21. The transmitter of claim 20, where the said multiple-input, multiple-output transform comprises a discrete cosine transform.

22. The transmitter of claim 17, wherein compressed set CQI information is transmitted from said receiving device to said transmitting device using an index corresponding to CQI information entries in codebooks in said receiving device and said transmitting device.

* * * * *